(12) United States Patent
Ho et al.

(10) Patent No.: US 6,661,907 B2
(45) Date of Patent: *Dec. 9, 2003

(54) FACE DETECTION IN DIGITAL IMAGES

(75) Inventors: Edwin Ho, Seven Hills (AU); Alison Joan Lennon, Balmain (AU)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,561

(22) Filed: Jun. 7, 1999

(65) Prior Publication Data

US 2003/0179911 A1 Sep. 25, 2003

(30) Foreign Application Priority Data

Jun. 10, 1998 (AU) .............................. PP4009

(51) Int. Cl.⁷ ................................. G06K 9/00
(52) U.S. Cl. ..................... 382/118; 348/169; 348/577; 358/522; 358/538; 382/103; 382/164; 382/165; 382/170
(58) Field of Search ................. 382/103, 118, 382/203, 237, 164–165, 170–173, 190, 224; 345/419; 358/1.9, 522, 538; 348/169–173, 577, 647, 657

(56) References Cited

U.S. PATENT DOCUMENTS

| | | | | |
|---|---|---|---|---|
| 5,715,377 A | * | 2/1998 | Fukushima et al. | ........... 358/1.9 |
| 5,912,980 A | * | 6/1999 | Hunke | ........................ 382/103 |
| 5,933,524 A | * | 8/1999 | Schuster et al. | ............ 382/168 |
| 5,949,962 A | * | 9/1999 | Suzuki et al. | ................. 358/1.9 |
| 6,028,960 A | * | 2/2000 | Graf et al. | ................... 382/203 |
| 6,072,496 A | * | 6/2000 | Guenter et al. | ............. 345/419 |
| 6,148,092 A | * | 11/2000 | Qian | ........................... 382/118 |
| 6,188,777 B1 | * | 2/2001 | Darrell et al. | .............. 382/103 |
| 6,263,113 B1 | * | 7/2001 | Abdel-Mottaleb et al. | .. 382/237 |
| 6,292,574 B1 | * | 9/2001 | Schildkraut et al. | ........ 382/117 |
| 6,360,002 B2 | * | 3/2002 | Kim et al. | ................... 382/103 |
| 6,504,942 B1 | * | 1/2003 | Hong et al. | ................. 382/103 |

OTHER PUBLICATIONS

"Detecting Human Faces In Color Images", M.H. Yang and N. Ahuja, Proceedings of the 1998 IEEE International Conference on Image Processing (ICIP 98), pp. 127–139 Chicago, Oct. 1998.

"Automatic Facial Feature Detection And Location", R. Pinto–Elias and J.H. Sossa–Azuela, IEEE International Conference on Computer and Pattern Recognition 1998, pp. 1360–1364.

"Tracking Human Faces In Real–Time", by J. Yang, et al., School Of Computer Science, Nov., 1995, pp. 1–29.

\* cited by examiner

*Primary Examiner*—Bhavesh M. Mehta
*Assistant Examiner*—Gregory Desire
(74) *Attorney, Agent, or Firm*—Fitzpatrick, Cella, Harper & Scinto

(57) ABSTRACT

The present invention discloses the detection of faces in digital images. Rather than subjecting the entire image (1) to computationally intensive face detection analysis, the image is instead segmented into regions (2) each of which has a substantially homogeneous color. Only those regions (2) having a predominantly skin color are then subjected to the face detection analysis. Preferably the face detection analysis is independent of facial color.

29 Claims, 3 Drawing Sheets

FACE DETECTION IN DIGITAL IMAGES

TECHNICAL FIELD OF THE INVENTION

The present invention relates to digital colour images and, in particular, to the detection of faces in colour digital images.

Colour digital images are increasingly being stored in multi-media databases, and utilised in various computer applications. In many such applications it is desirable to be able to detect the location of a face in a visual image as one step in a multi-step process. The multi-step process can include content-based image retrieval, personal identification or verification for use with automatic teller machines or security cameras, or automated interaction between humans and computational devices.

BACKGROUND ART

Various prior art face detection methods are known including eigenfaces, neural networks, clustering, feature identification and skin colour techniques. Each of these techniques has its strengths and weaknesses, however, one feature which they have in common is that they are computationally intensive and therefore very slow, or they are fast but not sufficiently robust to detect faces.

The eigenface or eigenvector method is particularly suitable for face recognition and there is some tolerance for lighting variation, however it does not cope with different viewpoints of faces and does not handle occlusion of various facial features (such as occurs if a person is wearing sunglasses). Also it is not scale invariant.

The neural network approach utilises training based on a large number of face images and non-face images and has the advantages of being relatively simple to implement, providing some tolerance to the occlusion of facial features and some tolerance to lighting variation. It is also relatively easy to improve the detection rate by re-training the neural network using false detections. However, it is not scale invariant, does not cope with different viewpoints or orientation, and leads to an exhaustive process to locate faces on an image.

The clustering technique is somewhat similar to the eigenface approach. A pixel window (e.g. 20×20) is typically moved over the image and the distance between the resulting test pattern and a prototype face image and a prototype non-face image is represented by a vector. The vector captures the similarity and differences between the test pattern and the face model. A neural network can then be trained to classify as to whether the vector represents a face or a non-face. While this method is robust, it does not cope with different scales, different viewpoints or orientations. It leads to an exhaustive approach to locate faces and relies upon assumed parameters.

The feature identification method is based upon searching for potential facial features or groups of facial features such as eyebrows, eyes, nose and mouth. The detection process involves identifying facial features and grouping these features into feature pairs, partial face groups, or face candidates. This process is advantageous in that it is relatively scale invariant, there is no exhaustive searching, it is able to handle the occlusion of some facial features and it is also able to handle different viewpoints and orientations. Its main disadvantages are that there are potentially many false detections and that its performance is very dependent upon the facial feature detection algorithms used.

The use of skin colour to detect human faces is described in a paper by Yang J and Waibel A (1995) "Tracking Human Faces in Real-Time" CMU-CS-95-210, School of Computer Science, Carnegie Mellon University. This proposal was based on the concept that the human visual system adapts to different brightnesses and illumination sources which implies that the human perception of colour is consistent within a wide range of environmental lighting conditions. It was therefore thought possible to remove brightness from the skin colour representation while preserving accurate, but low dimensional, colour information. As a consequence, in this prior art technique, the chromatic colour space was used. Chromatic colours (e.g. r and g) can be derived from the RGB values as:

$$r=R/(R+G+B) \text{ and } g=G/(R+G+B)$$

These chromatic colours are known as "pure" colours in the absence of brightness.

Utilising this colour space, Yang and Waibel found the distribution of skin colour of different people, including both different persons and different races, was clustered together. This means that the skin colours of different people are very close and that the main differences are in differences of intensity.

This prior art method first of all generated a skin colour distribution model using a set of example face images from which skin colour regions were manually selected. Then the test image was converted to the chromatic colour space. Next each image in the test image (as converted) was then compared to the distribution of the skin colour model. Finally, all skin colour pixels so detected were identified, and regions of adjacent skin colour pixels could then be considered potential face candidates.

This prior art method has the advantage that processing colour is much faster than processing individual facial features, that colour is substantially orientation invariant and that it is insensitive to the occlusions of some facial features. The system is also substantially viewpoint invariant and scale invariant. However, the method suffers from a number of disadvantages including that the colour representation of the face can be influenced by different lighting conditions, and that different cameras (e.g. digital or film) can produce different colour values even for the same person in the same environment.

However a significant disadvantage of the prior art methods is that the skin colour model is not very discriminating (ie selecting pixels on a basis of whether they are included in the skin colour distribution results in a lot of non-skin colour pixels being included erroneously). It is also difficult to locate clusters or regions of skin colour pixels that can be considered as candidate faces.

DISCLOSURE OF THE INVENTION

An object of the present invention is to provide an improved method of detecting one or more faces in digital colour images.

In accordance with a first aspect of the present invention there is disclosed a method of detecting a face in a colour digital image, said method comprising the steps of:

1. segmenting said image into a plurality of regions each having a substantially homogenous colour,
2. testing the colour of each said region created in step 1 to determine those regions having predominantly skin colour, and
3. subjecting only the regions determined in step 2 to further facial feature analysis whereby said regions created in step 1 not having a predominantly skin colour are not subjected to said further feature analysis.

Preferably the above described method includes the further step of using in step 2 a colour distribution model utilising previously characterised sampled data.

Still further, step 2 preferably also includes the use of a more well defined colour distribution model for a particular image (e.g. flash or non-flash) based on information provided from the image source (e.g. a camera).

Preferably the further facial feature analysis is independent of facial colour.

In accordance with a second aspect of the present invention there is disclosed apparatus for detecting a face in a colour digital image, said apparatus comprising, segmenting means to segment said image into a plurality of regions each having a substantially homogeneous colour, colour detecting means coupled to said segmenting means to determine those regions having predominantly skin colour, analysis means coupled to said colour detection means to subject only those regions having predominantly skin colour to a facial feature analysis.

In accordance with a third aspect of the present invention there is disclosed a computer readable medium incorporating a computer program product for detecting a face in a colour digital image, said computer program product including a sequence of computer implementable instructions for carrying out the steps of:

1. segmenting said image into a plurality of regions each having a substantially homogenous colour,
2. testing the colour of each said region created in step 1 to determine those regions having predominantly skin colour, and
3. subjecting only the regions determined in step 2 to further facial feature analysis whereby said regions created in step 1 not having a predominantly skin colour are not subjected to said further feature analysis.

BRIEF DESCRIPTION OF THE DRAWINGS

A preferred embodiment of the present invention will now be described with reference to the drawings in which.

DETAILED DESCRIPTION INCLUDING BEST MODE

Figure 1:
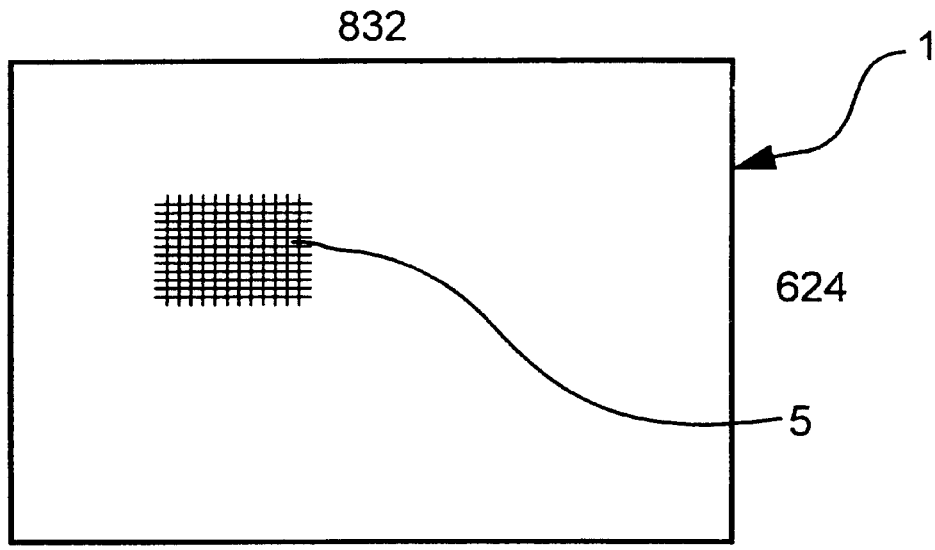
FIG. 1 is a schematic representation of the pixels of a colour digital image.

FIG. 1 illustrates a typical colour digital image 1 having a size of 832×624 pixels 5 each of which has an RGB value.

Figure 2:
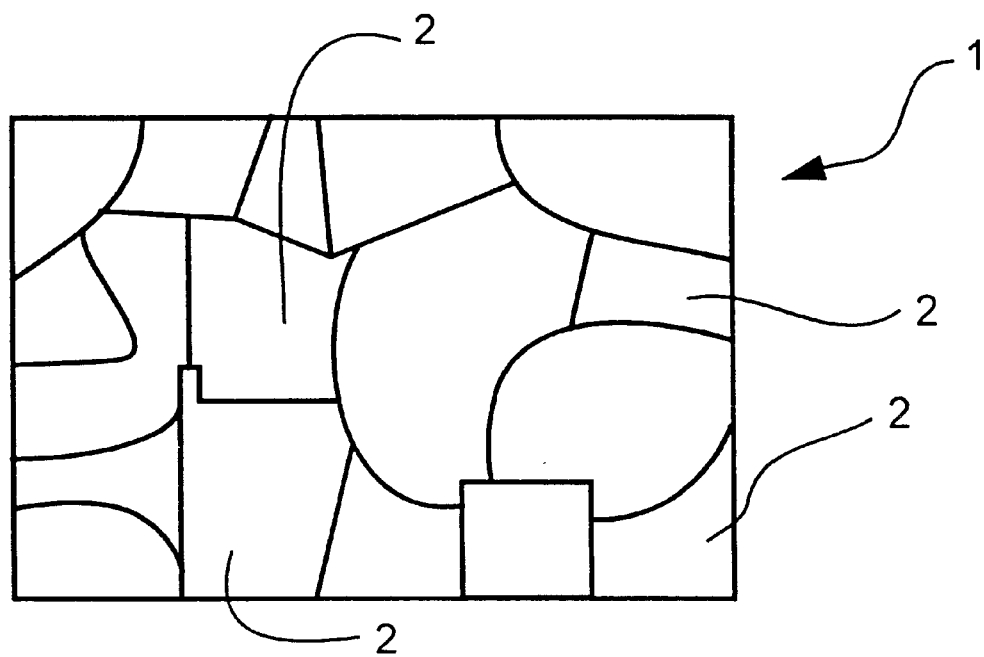
FIG. 2 shows the segmenting of the image of FIG. 1 into a plurality of regions each having a substantially homogenous colour.

However, rather than consider the image on a pixel by pixel basis as described above in relation to the prior art of Yang and Waibel, the image is segmented into regions 2 as schematically illustrated in FIG. 2 on the basis that all the pixels in each region have substantially the same colour.

Figure 3:
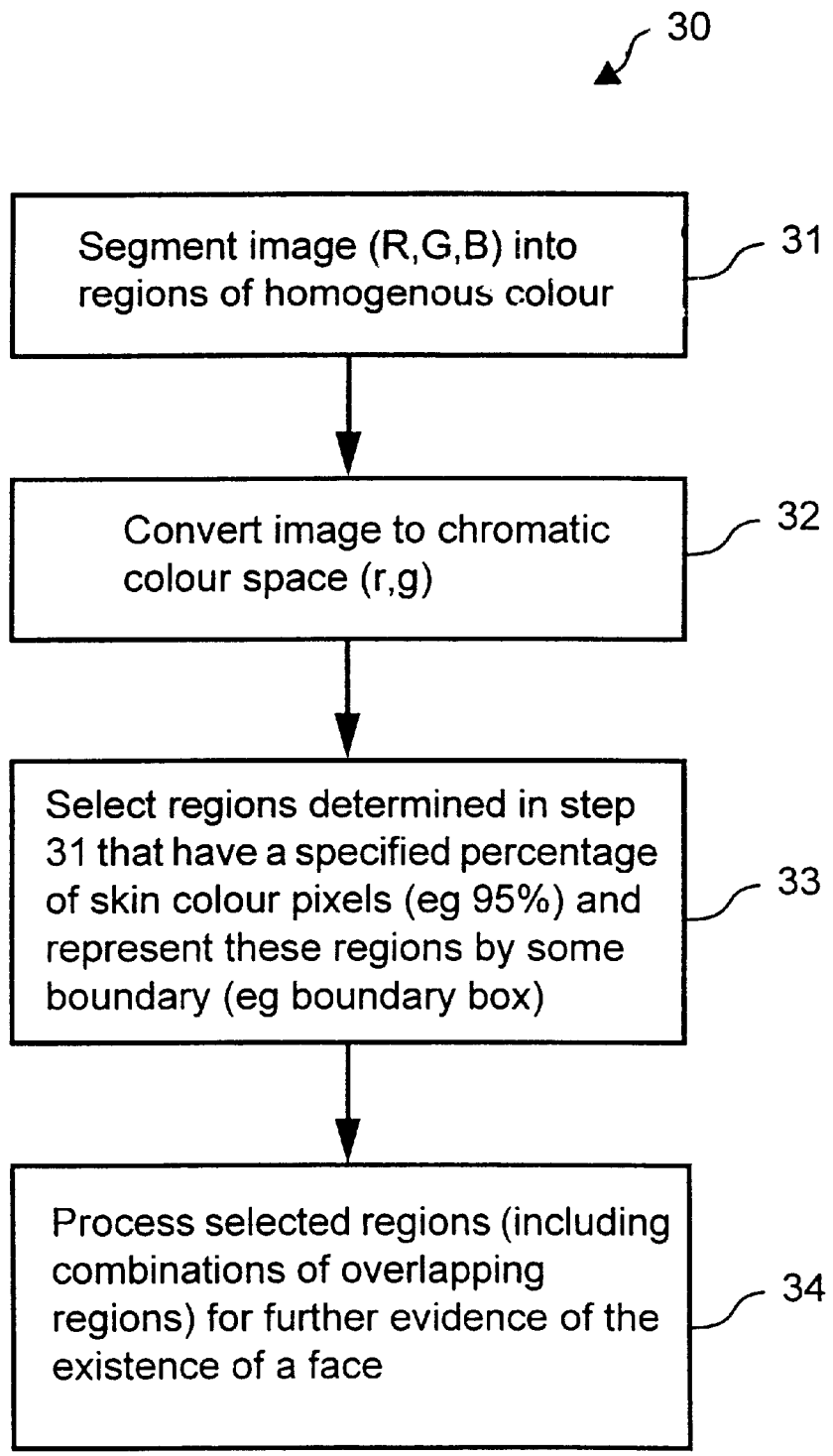
FIG. 3 is a flow chart of the preferred face detection process.

The overall process 30 is illustrated in the flow chart of FIG. 3, and the regional segmentation of the image is carried out at step 31. Next the regions of the image are converted in step 32 into the chromatic colour space (as described above). The next step 33 is to select those of the regions determined in step 31 which have a specified percentage (typically in the range 90–95%) of pixels having a skin colour. These selected regions are then conveniently represented by a boundary box or other boundary indication. Finally, at step 34 the selected regions, including any combinations of overlapping regions, are subjected to a further analysis (preferably not based on skin colour) to determine if the selected region(s) represent a face or faces.

This initial colour grouping can use any region based colour image segmentation technique. Preferably the image is partitioned into colour regions by seeking connected groups of pixels which have similar colours over a local region. Very small isolated initial spatial groupings can be ignored in order to find major colour regions and reduce a noise effect. A representative colour of each initial spatial region is determined by an average colour value of the region.

A colour region starts from an arbitrarily chosen pixel which is compared with its neighbouring pixels. The region size is increased by adding neighbouring pixels which are similar in colour, using a colour similarity threshold T. A neighbouring pixel is added to the region if $|Rp-Rm|<T$ and $|Gp-Gm|<T$ and $|Bp-Bm|<T|$, where Rp, Gp, Bp are R, G, B values of the neighbouring pixel and Rm, Gm, Bm represented average R, G, B values of the region.

When a region has no more neighbouring pixels of similar colour, the region stops growing and represents one of the initial spatial groupings. If the region size is below a predetermined threshold value, it is ignored. A region having a pixel number equal or greater than the predetermined threshold is represented by its average colour.

Then a new pixel which does not yet belong to any region is chosen to start a new colour region. The process continues until each pixel in the image either belongs to an initial spatial grouping or has been ignored as being part of a small region.

The initial spatial groupings provide a colour region segmentation of the image with each region being represented by its average colour.

In this way, for most images where the bulk of the image is not a face, or part of a face, the majority of pixels will be grouped into regions or objects (be they foreground or background, etc) which are clearly not faces. Therefore these non facial objects can be quickly eliminated on the basis of their colour.

Once the regions have been determined, they are then converted into the "pure" chromatic colour space utilising the equations given above so as to provide r and g values. A generous rule such as a rule that at least 85% of the pixels within a given region be of face colour can be used to select those regions worthy of further examination. Preferably, the test for face colour takes into account the nature of the original image, for example whether the image was taken with or without a flash. This information can be determined from the image source, e.g. a camera.

Thereafter, only those selected regions are subjected to a further test to determine the presence of facial features. This further test provides a conclusive determination as to whether or not a region constitutes a face. In this connection, the further test is likely to be computationally slower and therefore the above described elimination of regions ensures that the computationally slow method is only applied to relatively small portions of the overall image. Thus the total processing time is reduced.

The preferred method of verifying if a region represents a face relies upon edge detection techniques as a means of detecting facial features. In particular facial features such as eyes, eyebrows and mouths often appear as dark bars on a face and thus provide dark edges.

The preferred form of edge detection is use of an edge detection filter. This utilises two functions operating in orthogonal directions. To detect a horizontal bar a second derivative Gaussian function is used in the vertical direction and a Gaussian function is used in the horizontal direction.

Once an edge has been determined in this way each detected edge is examined. Any pair of detected edges can be found to be derived from, and thus be indicative of, a pair of eyes, a pair of eyebrows, or an eye and associated eyebrow, depending upon the relative position and size of the detected edges. Similarly, an individual edge can be derived from, and thus be indicative of, a mouth if it is located at an appropriate position relative to the eyes and/or eyebrows already detected.

Clearly by proceeding in this fashion a given region begins to accumulate facial features building from skin tone through eyebrows/eyes and then to a mouth. The more facial features found for a given region which is a face candidate, the greater the possibility that the candidate actually is a face.

Furthermore, the above described method has the advantage that it is able to cater for the circumstance where a face is backgrounded against a background region of substantially the same colour. Under these circumstances, in Yang and Waibel's method, no boundary between the face and the background would be likely to be detected. Therefore the region as a whole would be selected for further testing. However, the method of the embodiment of the present invention utilises the full colour space to segment the image, before making decisions about which pixels are skin colour. Consequently the face is more likely to be separated from the background. In addition, the method is naturally independent of orientation or partial occlusion of the face.

Furthermore, the method permits false positives to be examined at the further stage and therefore does not exclude from subsequent testing regions which are likely to be ultimately determined as a facial region.

Figure 4:
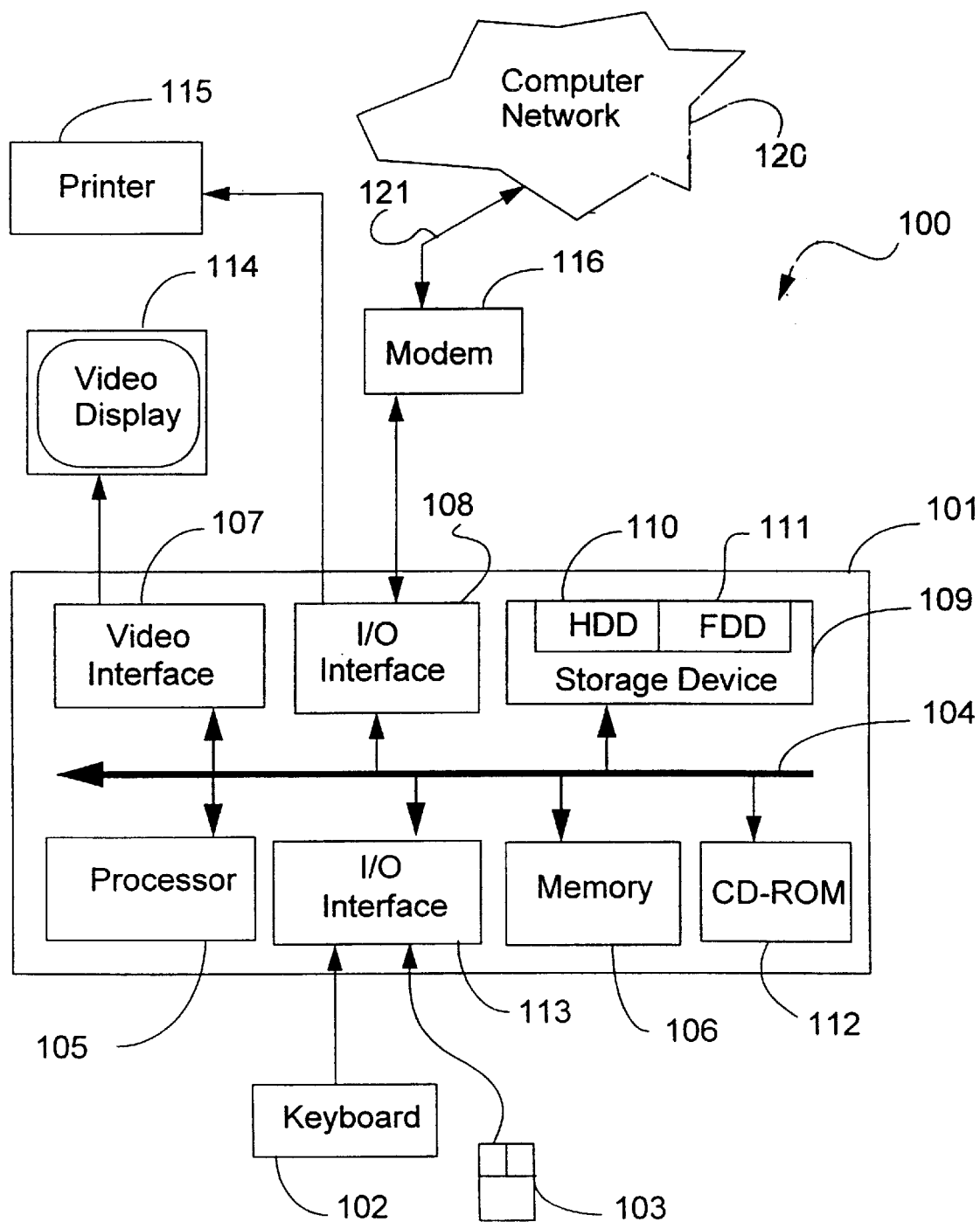
FIG. 4 is a schematic block diagram of a general purpose computer upon which the preferred embodiment of the present invention can be practised.

The above described method is preferably practiced using a conventional general-purpose computer system 100, such as that shown in FIG. 4 wherein the processes of FIG. 3 may be implemented as software, such as an application program executing within the computer system 100. In particular, the steps of the method are effected by instructions in the software that are carried out by the computer. The software may be divided into two separate parts; one part for carrying out the above method steps; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for detecting face candidate regions in accordance with the embodiments of the invention.

The computer system 100 comprises a computer module 101, etc input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable medium including magnetic tape, a ROM or integrated circuit, a magneto-optical disk, a radio or infrared transmission channel between the computer module 101 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of detecting face candidate regions may alternatively be implemented in dedicated hardware such as one or more integrated circuits performing the functions or sub functions of FIG. 3. Such dedicated hardware may include graphic processors, digital signal processors, or one or more microprocessors and associated memories.

Industrial Applicability

It is apparent from the above that the embodiments of the invention are applicable in fields such as content-based image retrieval, personal identification or verification for use with automatic teller machines or security cameras, or automated interaction between humans and computational devices.

The foregoing describes only some embodiments of the present invention, and modifications and/or changes can be made thereto without departing from the scope and spirit of the invention as defined in the claims.

In the context of this specification, the word "comprising" means "including principally but not necessarily solely" or "having" or "including" and not "consisting only of". Variations of the word comprising, such as "comprise" and "comprises" have corresponding meanings.

What is claimed is:

1. A method of detecting a face in a colour digital image captured by a camera, said method comprising the steps of:

segmenting the colour digital image into a plurality of regions each having a substantially homogenous colour;

testing the colour of each region created in said segmenting step to determine those regions having predominantly skin colour, wherein said testing uses a colour distribution model that is dependent on settings of the camera upon capture of the colour digital image; and subjecting only the regions determined in said testing step to facial feature analysis whereby the regions created in said segmenting step not having predominantly skin colour are not subjected to facial feature analysis.

2. The method as claimed in claim 1, wherein said colour distribution model utilizes previously sampled data.

3. The method as claimed in claim 2, wherein the colour distribution model is selected from a group consisting of models utilizing previously sampled data taken from images taken with use of a flash and images taken without use of a flash.

4. The method as claimed in claim 1, wherein chromatic colours derived from RGB values are used in said testing step.

5. The method as claimed in claim 1, wherein the facial feature analysis in said subjecting step is independent of facial colour.

6. The method as claimed in claim 5 wherein the facial feature analysis comprises edge detection.

7. The method as claimed in claim 6, wherein the edge detection utilises an edge detection filter comprising a second derivative Gaussian function in a first direction substantially orthogonal to an edge to be detected and a Gaussian function in a second direction substantially orthogonal to the first direction.

8. The method as defined in claim 6, wherein the facial feature analysis is carried out utilising the spatial relationship of detected edges.

9. The method as defined in claim 1, wherein said segmenting step includes growing a region by determining the average colour of a group of pixels, determining the difference between the average colour of the group and the average colour of pixels adjacent to the group, and, if the colour difference is less than a predetermined threshold, adding the adjacent pixels to the group.

10. An apparatus for detecting a face in a colour digital image captured by a camera, said apparatus comprising:

segmenting means to segment said image into a plurality of regions each having a substantially homogeneous colour;

colour detecting means coupled to said segmenting means to determine those regions having predominantly skin colour, said colour detecting means using a colour distribution model that is dependent on settings of the camera at a time of capture of the colour digital image when determining regions of predominantly skin colour; and analysis means coupled to said colour detection means to subject only those regions having predominantly skin colour to facial feature analysis.

11. The apparatus as claimed in claim 10, wherein said colour detecting means includes a storage means storing previously sampled data for use in said colour distribution model.

12. The apparatus as claimed in claim 11, wherein the colour distribution model is selected from a group consisting of models utilizing previously sampled data taken from images taken with use of a flash and images taken without use of a flash.

13. The apparatus as claimed in claim 10, further comprising chromatic colour calculations means to derive chromatic colour values from RGB values of the digital colour image.

14. The apparatus as claimed in claim 10, wherein the facial feature analysis of said analysis means is independent of facial colour.

15. The apparatus as claimed in claim 14, wherein said analysis means includes an edge detector to detect edges in the digital colour image.

16. The apparatus as claimed in claim 15, wherein said analysis means has an edge detection filter comprising a second derivative Gaussian function in a first direction substantially orthogonal to an edge to be detected and a Gaussian function in a second direction substantially orthogonal to the first direction.

17. The apparatus as claimed in claim 15 or 16, wherein said analysis means includes a spatial determinator to determine a spatial relationship of detected edges.

18. The apparatus as claimed in claim 10, further comprising an accumulator means and a colour difference means to determine a difference between the average colour of a group of pixels and the average colour of pixels adjacent to that group, wherein if the colour difference is less than a predetermined threshold, the adjacent pixels are added to said accumulator means to thereby grow a region.

19. A computer readable medium incorporating a computer program product for detecting a face in a colour digital image captured by a camera, said computer program product including a sequence of computer implementable instructions for carrying out the steps of:

segmenting the colour digital image into a plurality of regions each having a substantially homogenous colour;

testing the colour of each region created in said segmenting step to determine those regions having predominantly skin colour, wherein said testing uses a colour distribution model that is dependent on settings of the camera at a time of capture of colour digital image; and subjecting only the regions determined in said testing step to facial feature analysis whereby the regions created in said segmenting step not having predominantly skin colour are not subjected to facial feature analysis.

20. The computer readable medium as claimed in claim 19, wherein said colour distribution model utilizes previously sampled data.

21. The computer readable medium as claimed in claim 20, wherein the colour distribution model is selected from a group consisting of models utilizing previously sampled data taken from images taken with use of a flash and images taken without use of a flash.

22. The computer readable medium as claimed in claim 19, wherein chromatic colours derived from RGB values are used in said testing step.

23. The computer readable medium as claimed in claim 19, wherein the facial feature analysis in said subjecting step is independent of facial colour.

24. The computer readable medium as claimed in claim 23, wherein the facial feature analysis comprises edge detection.

25. The computer readable medium as claimed in claim 24, wherein the edge detection utilises an edge detection filter comprising a second derivative Gaussian function in a first direction substantially orthogonal to an edge to be detected and a Gaussian function in a second direction substantially orthogonal to the first direction.

26. The computer readable medium as claimed in claim 24, wherein the facial feature analysis is carried out utilising a spatial relationship of detected edges.

27. The computer readable medium as claimed in claim 19, wherein said segmenting step includes growing a region by determining the average colour of a group of pixels, determining the difference between the average colour of the group and the average colour of pixels adjacent to the group, and, if the colour difference is less than a predetermined threshold, adding the adjacent pixels to the group.

28. A method of detecting a face in a colour digital image captured by a camera, said method comprising the steps of:

segmenting the colour digital image into a plurality of regions each having a substantially homogenous colour;

testing the colour of each region created in said segmenting step to determine those regions having predominantly skin colour, wherein said testing uses a threshold altered by settings of the camera upon capture of the colour digital image; and subjecting only the regions determined in said testing step to facial feature analysis whereby the regions created in said segmenting step not having predominantly skin colour are not subjected to facial feature analysis.

29. A computer readable medium incorporating a computer program product for detecting a face in a colour digital image captured by a camera, said computer program product including a sequence of computer implementable instructions for carrying out the steps of:

segmenting the colour digital image into a plurality of regions each having a substantially homogenous colour;

testing the colour of each region created in said segmenting step to determine those regions having predominantly skin color, wherein said testing uses a threshold altered by settings of the camera upon capture of the colour digital image; and subjecting only the regions determined in said testing step to facial feature analysis whereby the regions created in said segmenting step not having predominantly skin colour are not subjected to facial feature analysis.

* * * * *

UNITED STATES PATENT AND TRADEMARK OFFICE
CERTIFICATE OF CORRECTION

PATENT NO. : 6,661,907 B2
DATED : December 9, 2003
INVENTOR(S) : Edwin Ho et al.

It is certified that error appears in the above-identified patent and that said Letters Patent is hereby corrected as shown below:

<u>Column 4,</u>
Line 25, "represented" should read -- represents --; and
Line 30, "equal" should read -- equal to --.

Signed and Sealed this

First Day of June, 2004

JON W. DUDAS
*Acting Director of the United States Patent and Trademark Office*